US011033761B2

(12) United States Patent
Koeger et al.

(10) Patent No.: US 11,033,761 B2
(45) Date of Patent: Jun. 15, 2021

(54) COMPACT NBC FILTRATION SYSTEM FOR COLLECTIVE PROTECTION SHELTERS

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

( * ) Notice: Subject to any disclaimer, the term of this patent is extended or adjusted under 35 U.S.C. 154(b) by 315 days.

(21) Appl. No.: 16/318,635

(22) PCT Filed: Jul. 5, 2017

(86) PCT No.: PCT/IL2017/050747
§ 371 (c)(1),
(2) Date: Jan. 17, 2019

(87) PCT Pub. No.: WO2018/015943
PCT Pub. Date: Jan. 25, 2018

(65) Prior Publication Data
US 2019/0282841 A1    Sep. 19, 2019

(30) Foreign Application Priority Data
Jul. 18, 2016  (IL) .......................................... 246827

(51) Int. Cl.
*A62B 13/00*    (2006.01)
*A62B 23/04*    (2006.01)
(Continued)

(52) U.S. Cl.
CPC .............. *A62B 13/00* (2013.01); *B01D 46/42* (2013.01); *B01D 2267/40* (2013.01); *E04H 9/04* (2013.01)

(58) Field of Classification Search
CPC ...... B01D 46/42; B01D 35/147; B01D 29/56; B01D 53/34; B01D 2267/40; A62B 13/00; A62B 23/04; F16H 7/00; E04H 9/04
(Continued)

(56) References Cited

U.S. PATENT DOCUMENTS 3,363,540 A  *  1/1968  Mason .................... A62B 13/00
                                                    454/194
6,328,775 B1 * 12/2001  Fuchs .................... A62B 23/04
                                                    109/1 S
(Continued)

FOREIGN PATENT DOCUMENTS

CH          714762 A2  * 12/1978  ............. A62B 13/00
DE        3403197 A1      8/1985
(Continued)

OTHER PUBLICATIONS

ISR PCT/IL2017/050747, Prepared by the Israel Patent Office, dated Oct. 25, 2017, 4 pages.

*Primary Examiner* — Minh Chau T Pham
(74) *Attorney, Agent, or Firm* — Brooks Kushman P.C.

(57) ABSTRACT

A floor-space saving NBC filtration system for collective protection shelters with NBC filter unit and means for changing the NBC filtration system state between a ventilation mode, effective during normal times or conventional hazard, and a NBC protection mode, effective during NBC hazard. The NBC filtration system is contained in a space out of a comfortable reach of the shelter occupants thus saving usable floor-space. The means for changing the NBC filtration system state is operated from a location within the
(Continued)

comfortable reach of the shelter occupants. The NBC filter unit inlet and outlet are located at close proximity to each other, a pre-filter outlet is located in proximity to the NBC filter unit inlet and outlet with a changeover valve, serving as means for changing the NBC filtration system state, located there between. Resulting in simple operation and space saving by the changeover valve replacing prior art space consuming flexible pipes.

16 Claims, 11 Drawing Sheets

(51) Int. Cl.
    *B01D 46/42* (2006.01)
    *E04H 9/04* (2006.01)

(58) Field of Classification Search
    USPC .............. 55/385.2, 467, 417, 469, 486, 505; 96/422; 109/1 S
    See application file for complete search history.

(56) References Cited

U.S. PATENT DOCUMENTS

| | | | | |
|---|---|---|---|---|
| 2004/0182449 | A1* | 9/2004 | Schneider | F24F 13/1426 137/527 |
| 2005/0048908 | A1* | 3/2005 | Koeger | F24F 3/16 454/237 |
| 2006/0286921 | A1* | 12/2006 | Arts | F24F 8/10 454/187 |
| 2007/0017510 | A1* | 1/2007 | Riedo | A62B 13/00 128/201.25 |
| 2007/0190922 | A1* | 8/2007 | Fuchs | G21F 9/04 454/187 |
| 2010/0270818 | A1* | 10/2010 | Mills | B60H 1/00414 296/24.4 |
| 2016/0023151 | A1 | 1/2016 | Swenerton et al. | |

FOREIGN PATENT DOCUMENTS

| | | | | | |
|---|---|---|---|---|---|
| DE | | 3617593 | A1 | 11/1987 | |
| EP | WO | 2005/029506 | * | 3/2005 | ............... G21F 9/00 |
| EP | WO | 2018/220610 | * | 12/2018 | ............. A62B 13/00 |
| EP | WO | 2018/229743 | * | 12/2018 | ............. A62B 13/00 |
| EP | WO | 2020/031169 | * | 2/2020 | ............... F16H 7/00 |
| EP | WO | 2020/100132 | * | 5/2020 | ............... F16H 7/00 |
| GB | | 511258 | A | 8/1939 | |
| GB | | 513699 | A | 10/1939 | |
| GB | | 985821 | A | 3/1965 | |
| IL | | 214577 | | 1/2012 | |
| IL | | 212659 | | 2/2012 | |
| IL | | 235151 | | 1/2015 | |
| RO | | 119383 | B1 | 8/2004 | |

* cited by examiner

COMPACT NBC FILTRATION SYSTEM FOR COLLECTIVE PROTECTION SHELTERS

CROSS-REFERENCE TO RELATED APPLICATION

This application is the U.S. national phase of PCT Application No. PCT/IL2017/050747 filed on Jul. 5, 2017, which claims priority to IL Patent Application No. 246827 filed on Jul. 18, 2016, the disclosures of which are incorporated in their entirety by reference herein.

FIELD OF THE INVENTION

The present invention relates to a space and floor-space saving Nuclear Biological Chemical (NBC) filtration system for collective protection shelters, more particularly to a space and floor-space saving NBC filtration system for collective protection shelters with occupant capacity in the range of 20 to 150 people.

BACKGROUND OF THE INVENTION

In Israel, public constructions such as office buildings, shopping malls, industrial facilities, entertainment centers and the like, must preserve an NBC protected space for use at emergency. The preserved space may be used for other periodical purposes at normal times. Common utilization is meeting rooms that do not require heavy furniture and can be rapidly cleared during an emergency event. Due to the high cost per square meter of floor-space in such buildings, it is desired that the NBC filtration system would take up minimal space. Currently available NBC filtration systems for large collective protection shelters may occupy between 1.5 to 4 square meters of floor-space according to capacity and their appearance is not attractive. Typically the current NBC filtration systems are hidden behind light walls or curtains to improve appearance and avoid vandalism, thus consuming even more space.

The regulations indicate that such public NBC filtration system should include a pre-filter, an NBC filter unit composed of a particulate filter and an adsorption filter, and an electric blower appropriate for certain amount of air exchange. Furthermore, the NBC filtration system should have a manual air exchange backup operated by a human power interface such as a hand crank for hand operation in case of power failure. Typically, the manual air exchange backup includes a speed increaser gear having an input shaft manually rotated by the hand crank and an output shaft engaged to rotate the electric blower. The hand crank may be detachable in order to free space during normal times, however in order to conveniently operate the hand crank during NBC hazard and electric power failure, the entire system must be visibly fitted at a reachable location.

Additionally, there is a need to change the NBC filtration system state, between a ventilation mode effective during normal times or conventional hazard and NBC protection mode effective during NBC hazard. Current available systems require dismantling and reconnection of flexible pipes to the NBC filter unit that is used during NBC alarm only. The flexible pipes are space consuming, they must be visibly fitted at a reachable location which otherwise could be used for commercial purposes. Furthermore, the flexible pipes may be difficult to the average user to reconnect under stress. An example of the currently available NBC filtration systems for collective shelters can be found in Israeli patent application 235151 to the present applicant.

In order to reduce the space consumed by collective filtration systems, DE3403197 describes an NBC filter with internal bypass that can be rotated and fitted in one of two positions, first position for ventilation and second position for filtration, thus eliminating the flexible pipes. The suggested internal ventilation bypass however has no filtration at all, while in large NBC filtration systems it is desired that the ventilation mode includes at least a pre-filter. Additionally the operation of dismantling the relatively large and heavy filter, rotating it upside down and reassembling may be difficult to the average user to perform under stress.

Israeli patent application 214577 to the present applicant, describes a two-way changeover valve within an NBC air filtration system that allows changing from ventilation mode to NBC filtration mode with only a single action. The changeover valve has a manual state selector handle attached thereon, thus although easier to operate, yet the entire system must be visibly fitted at a reachable location.

Additionally the changeover valve was designed for small systems where ventilation mode has no filtration at all, while as said above, in large NBC filtration systems it is desired that the ventilation mode includes at least a pre-filter.

SUMMARY OF THE INVENTION

Accordingly, it is a principal object of the present invention to overcome the disadvantages and limitations of prior art systems and provide a floor-space saving and general space saving, simple to operate NBC filtration system for collective protection shelters that would occupy from none up to 2 square meters of floor space according to installation type and capacity. The provided systems will also feature better appearance.

These and other subjects are achieved according to the present invention by providing a floor-space saving NBC filtration system for collective protection shelters comprising at least an NBC filter unit, an electric blower and means for changing the NBC filtration system state between a ventilation mode, effective during normal times or conventional hazard, and a NBC protection mode, effective during NBC hazard. According to the invention, the NBC filtration system is contained in a space out of a comfortable reach of the shelter occupants thus saving usable floor-space. While the means for changing the NBC filtration system state is operated from a location within the comfortable reach of the shelter occupants.

The NBC filtration system may further comprise a manual air exchange backup for operation during electric power failure, including a human power interface such as a hand crank or foot pedals. The human power interface is operated from a location within the comfortable reach of the shelter occupants.

Optionally, the space saving NBC filtration system for collective protection shelters comprising at least a pre-filter, an NBC filter unit including a particulate filter and an adsorption filter, a changeover valve, an electric blower and manual air exchange backup operated by a human power interface. The NBC filtration system is operative at ventilation mode during normal times or conventional hazard and at NBC protection mode during NBC hazard. The pre-filter is in service at both ventilation mode and NBC protection mode, while the NBC filter unit is in service at NBC protection mode only. The changeover valve is switched during NBC protection hazard to redirect air through the NBC filter unit. According to the invention, the NBC filter unit inlet and outlet are located at close proximity to each other, and the pre-filter outlet is located in proximity to the NBC filter unit inlet and outlet, with the changeover valve located there between. Resulting in simple operation and space saving by the changeover valve replacing prior art space consuming flexible pipes.

BRIEF DESCRIPTION OF THE DRAWINGS

The invention and the way it may be carried out in practice, will be understood with reference to the following illustrative figures, by way of non-limiting example only, in which like reference numerals identify like elements, and in which.

DETAILED DESCRIPTION OF EMBODIMENTS

Figure 1A:
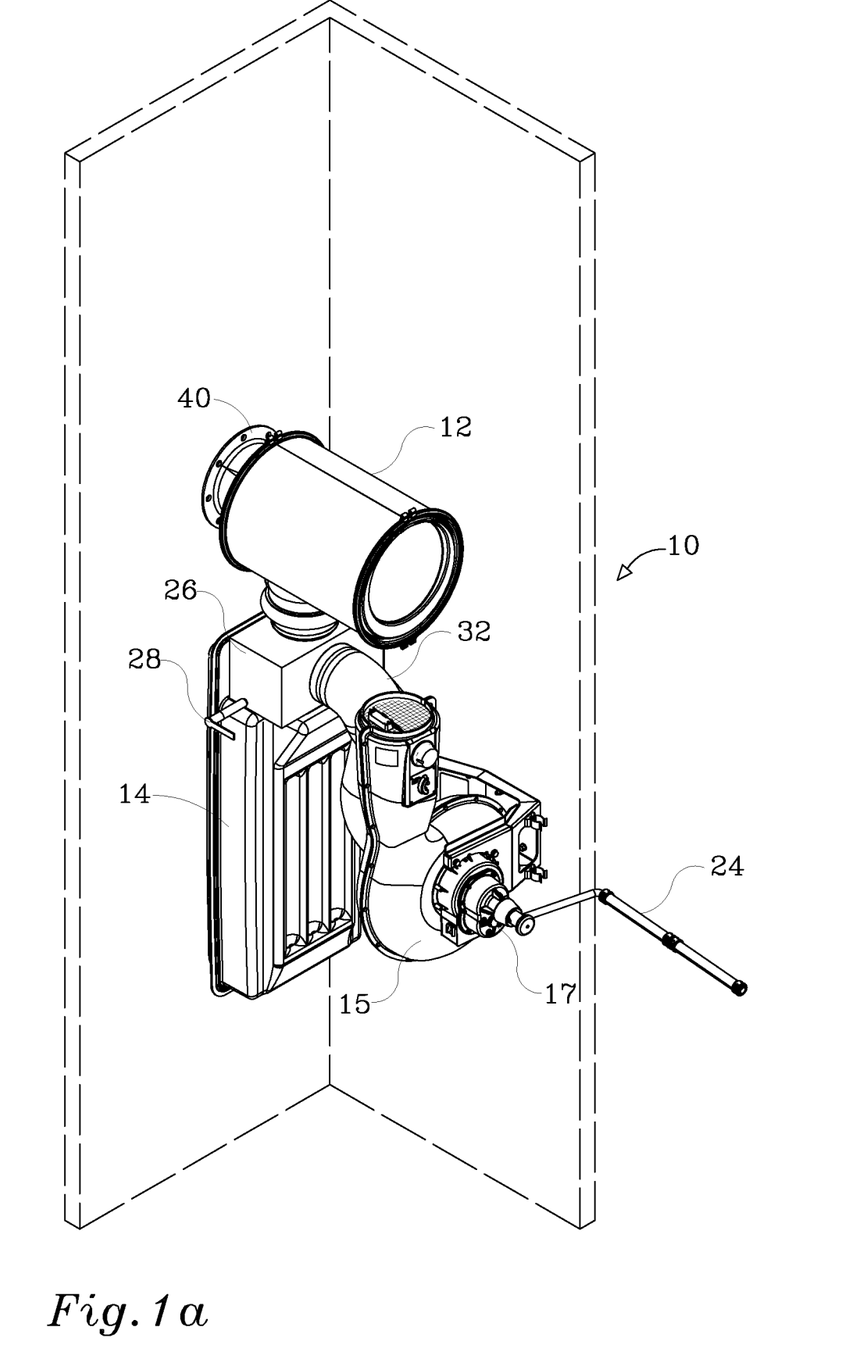
FIGS. 1a and 1b are a perspective views of an NBC filtration system made according to an embodiment of the present invention, where the system is vertically mounted.

With reference to the figures, the dashed lines shown behind each of the embodiments indicate a corner of the collective protection shelter walls. According to one embodiment of the present invention, there is shown in FIG. 1a, a space and floor-space saving NBC filtration system, generally referenced 10, for collective protection shelters. The NBC filtration system comprising an optional pre-filter 12, an NBC filter unit 14 typically including a particulate filter (11 FIG. 3) and an adsorption filter (13 FIG. 3), an electric blower 15 and optional manual air exchange backup 17. The manual air exchange backup 17 is operated using a human power interface such as a detachable hand crank 24 or a foot pedal (not shown) to power the electric blower 15 during electric power failure. Means are provided such as changeover valve 26 for changing The NBC filtration system 10 state, between a ventilation mode effective during normal times or conventional hazard and a NBC protection mode effective during NBC hazard. The pre-filter 12 is in service at both ventilation mode and NBC protection mode, while the NBC filter unit 14 is in service at NBC protection mode only. The means for changing the NBC filtration system 10 state, such as changeover valve 26, is switched by a state selector handle 28 during NBC protection hazard to redirect air through the NBC filter unit, as will be hereinafter explained.

Figure 1B:
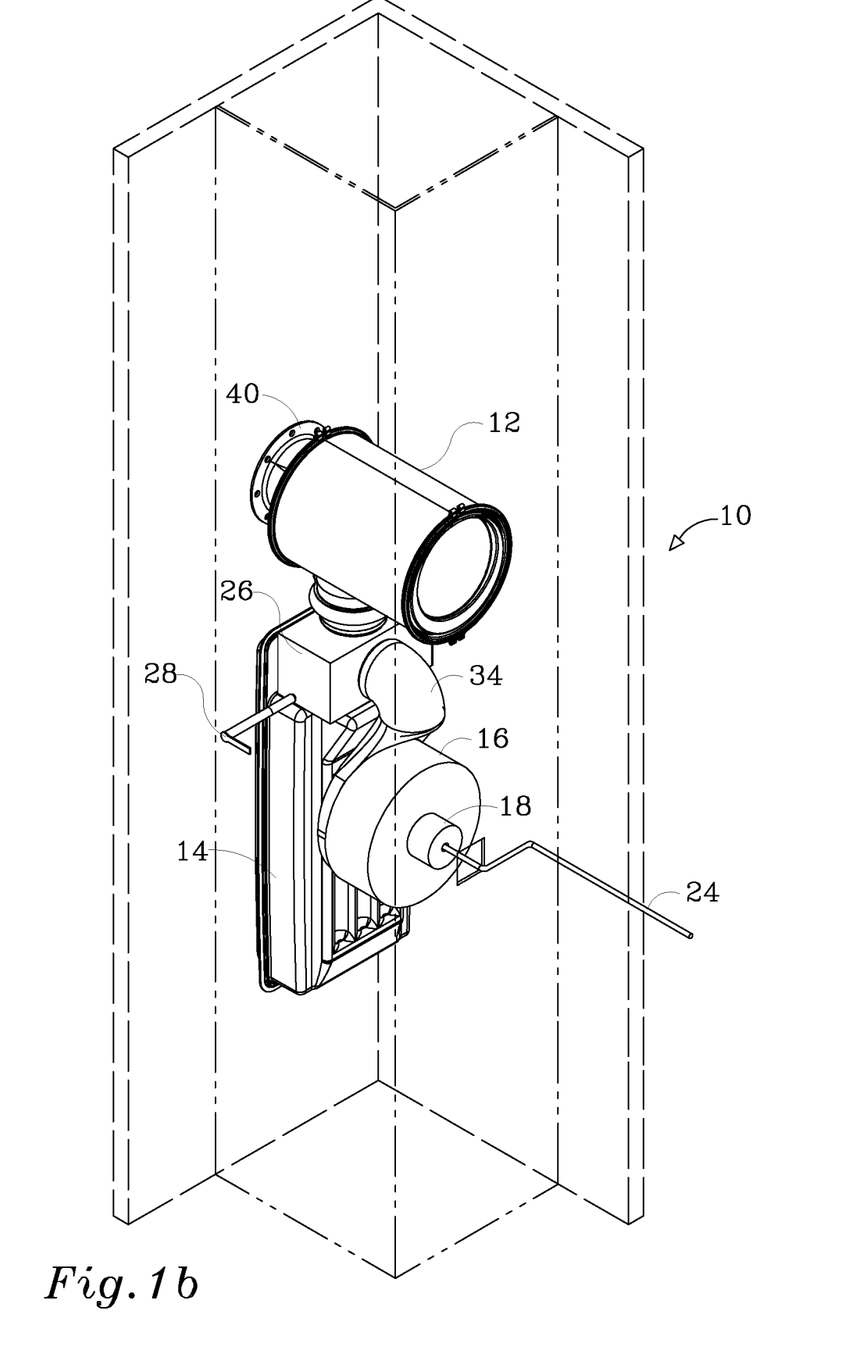

As shown in FIG. 1a, the electric blower 15 is configured as a separate unit being in air flow communication with the changeover valve 26 by a flexible pipe 32 (partially shown). The same principal system configuration is shown also in FIG. 1b, however the electric blower 16 of FIG. 1b, is configured as a compact component fixedly attached to the NBC filter unit 14. The electric blower 16 is in air flow communication with the changeover valve 26 through a compact rigid curved duct 34. The dotted lines of FIG. 1b in front of the NBC filtration system represent a separating wall that visually hides the NBC filtration system, yet permits operation without removal of the separating wall.

Yet with reference to FIG. 1b, space and floor space reduction is achieved by the preferably elongated NBC filter unit 14 positioned vertically under the pre-filter 12 attached by flange 40 to an embedded in wall vent pipe (not shown) as known in the art. The electric blower 16 with manual air exchange backup 18 is attached to the NBC filter unit 14 located at a proper height for use by an average person, such that the attached human power interface for example hand crank 24 can readily be used during electric power failure without any further adjustments. Floor space utilization is very small due to the small cross section of the elongated cuboid shape of the NBC filter unit 14 when it is positioned vertically. The floor space consumed by the system in the configuration of FIG. 1b, is about half square meter.

Figure 2:
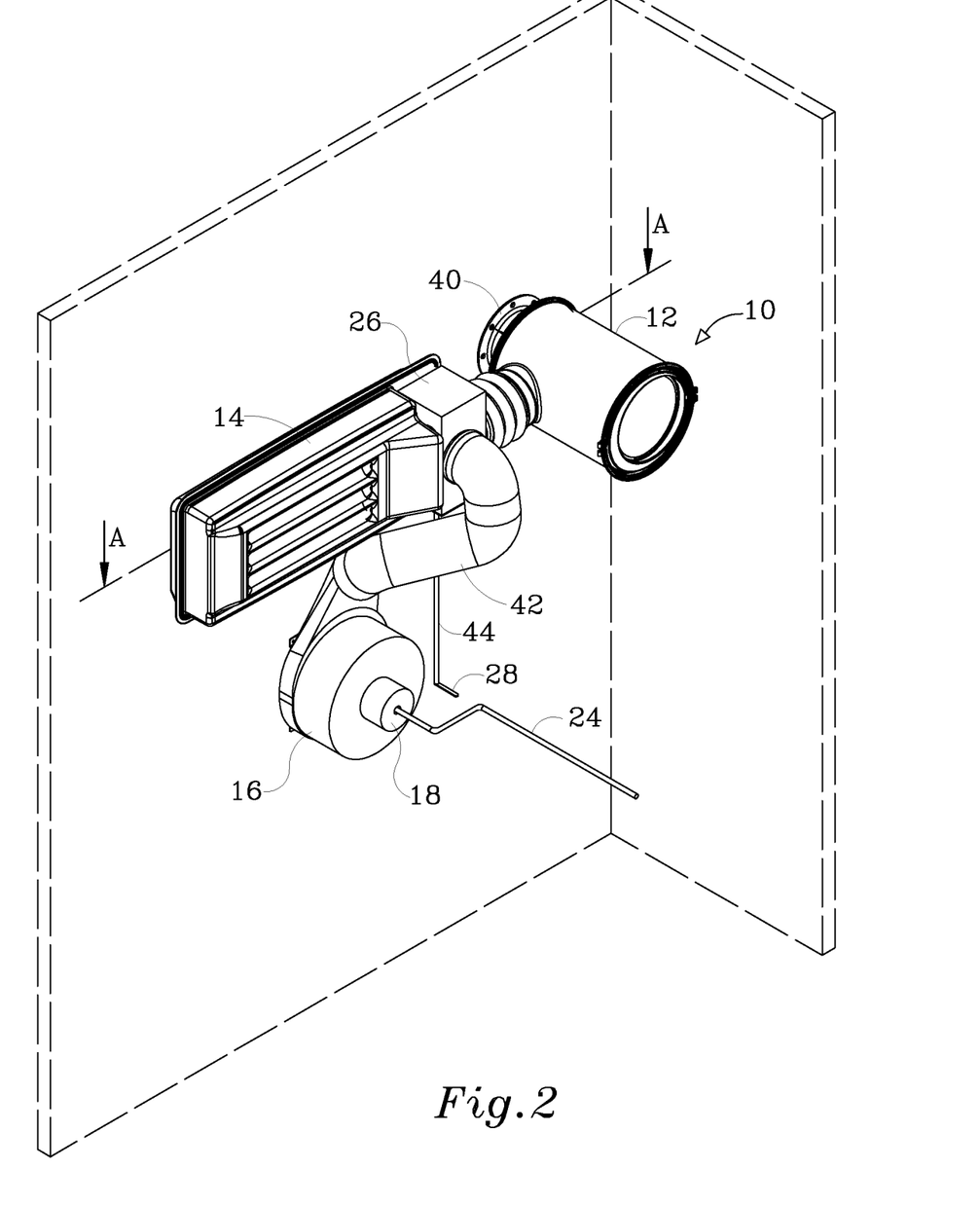
FIG. 2 is a perspective view of an NBC filtration system made according to an embodiment of the present invention where the system is horizontally mounted higher than average person height, except of the electric blower and manual air exchange backup.

Optionally, with reference to FIGS. 1b and 2, the NBC filtration system 10 may be contained in a space out of the comfortable reach of the shelter occupants thus saving usable floor-space. For easy operation during NBC emergency, the means for changing the NBC filtration system state are remotely operated from a location within the comfortable reach of the shelter occupants. For example, the space containing the NBC filtration system 10 may be located higher than an average person height as shown in FIG. 2, behind a separating wall as shown by dotted lines in FIG. 1b, or locked in a sealed safety equipment compartment.

Figure 6A:
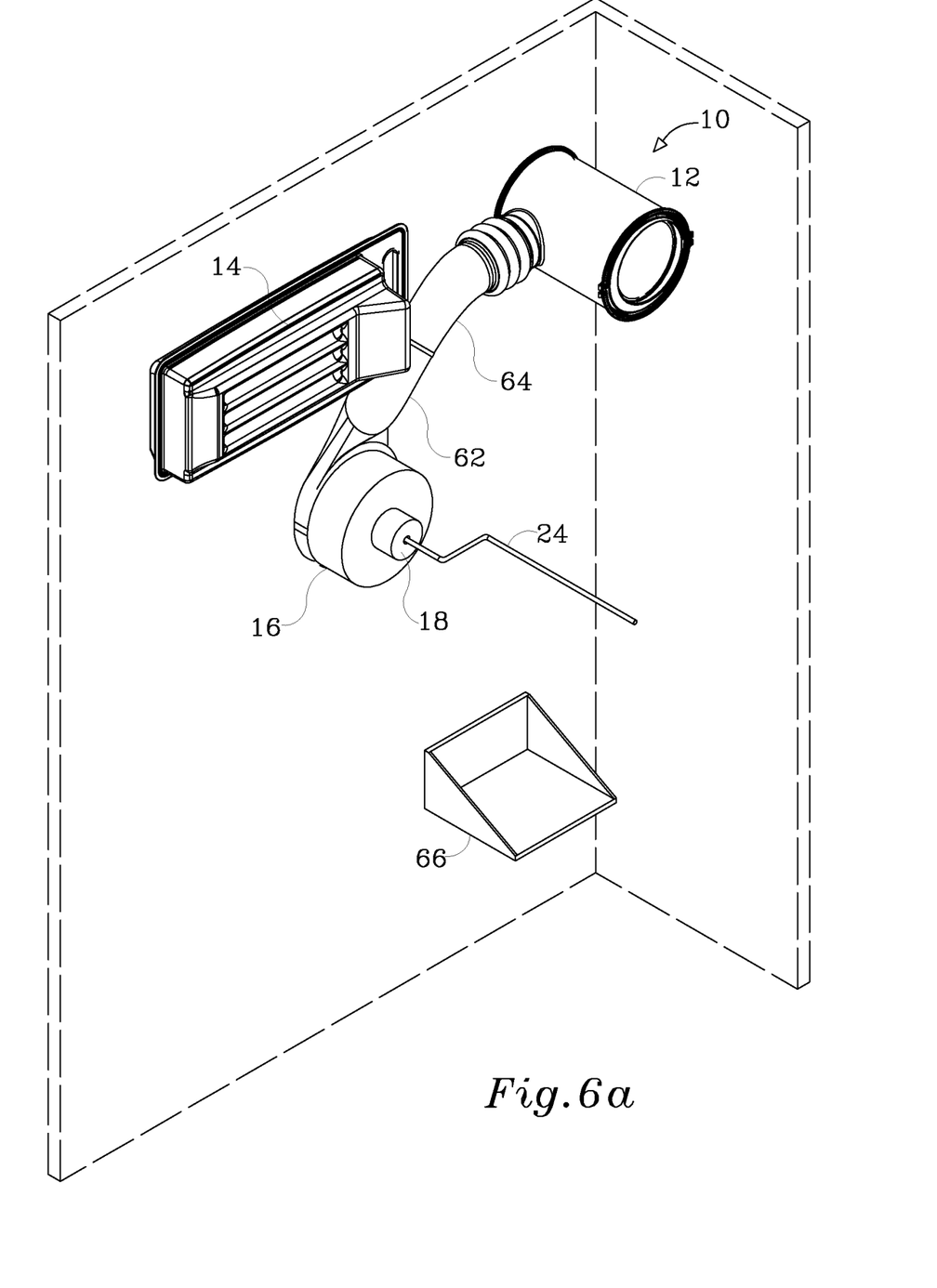
FIGS. 6a and 6b are perspective views of an NBC filtration system made according to an embodiment of the present invention where the entire system is fitted higher than average person height, and the system state is set by flexible pipe reconnection with the aid of a foldable stool.
Figure 6B:
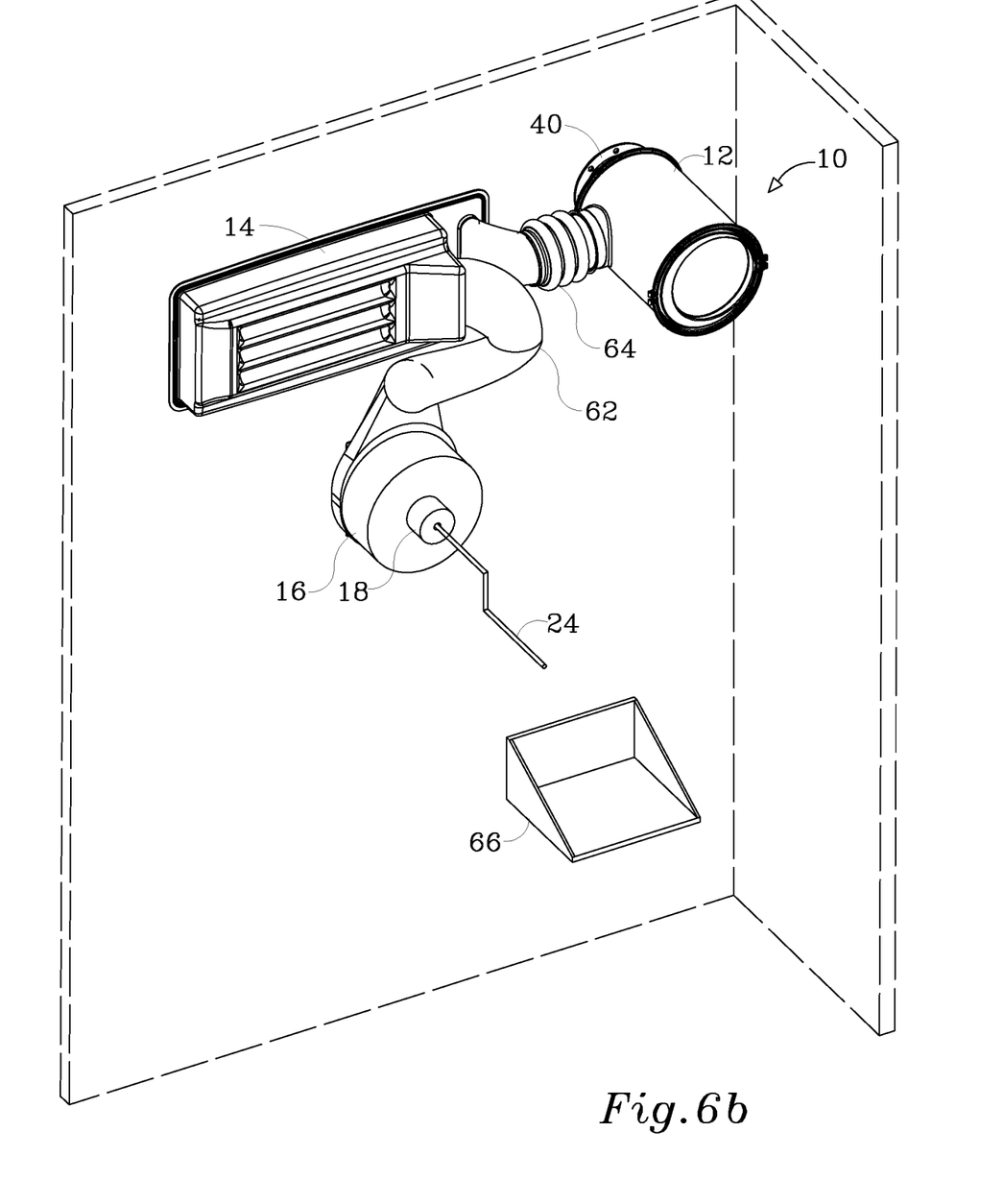

The means for changing the NBC filtration system state is preferably a changeover valve 26, however other means such as flexible pipe twisting mechanism or repositioning of the NBC filter unit are also possible and falls under the scope of the present invention, as will be hereinafter explained with reference to FIGS. 6a and 6b.

The state selector handle 28 of changeover valve 26, may be extended for remote switching of the changeover valve state as mentioned above, from a location within the comfortable reach of the shelter occupants such as in front of a separating wall as shown in FIG. 1b or at the arm height of an average person as shown in FIG. 2.

With reference to FIG. 2, the pre-filter 12 is cylindrical in shape, and is secured by flange 40 to a vent pipe embedded in an external concrete wall of the collective protection shelter. The NBC filter unit 14 preferably but not necessarily accepts an elongated cuboid shape and is horizontally configured at the height of the vent pipe. The vent pipe and flange 40 may be located higher than an average person height, thus the space below the pre-filter 12 and the NBC filter unit 14, is available for daily usage.

Even if for some reason the vent pipe is located lower than the average person height, yet the other system parts may be located above the average person height by means of providing a height adapter pipe (not shown).

The manual air exchange backup 18 mentioned above, is intended for forcing fresh air into the shelter during electric power failure when the electric blower 16 is not effective. As shown in FIG. 2, the manual air exchange backup is operated by the human power interface such as hand crank 24. While the NBC filtration system may be located at a position higher than an average person height, or behind a separating wall, the human power interface such as hand crank 24 is operated from a location within the comfortable reach of the shelter occupants, such as a reachable position at the proper height for use by an average person. According to the option shown in FIG. 2, the electric blower 16, with air exchange backup 18 and human power interface such as hand crank 24 are fixedly located below the NBC filter unit 14 at the proper height for use by an average person. A flexible pipe 42 permits air flow between the electric blower 16 and change over valve 26.

Yet with reference to FIG. 2, when the NBC filtration system 10 is assembled higher than an average person height, the changeover valve 26 is manually switched by mechanical or electrical means located at a reachable position approximately the arm height of an average person. As shown in FIG. 2, the mechanical means is a rotate-able knob or state selector handle 28 fitted at the end of an extension shaft 44 which is linked to the changeover valve 26. It will be understood that the mechanical or electrical means may accept many different linkage systems and that they all fall under the scope of the present invention.

Figure 3:
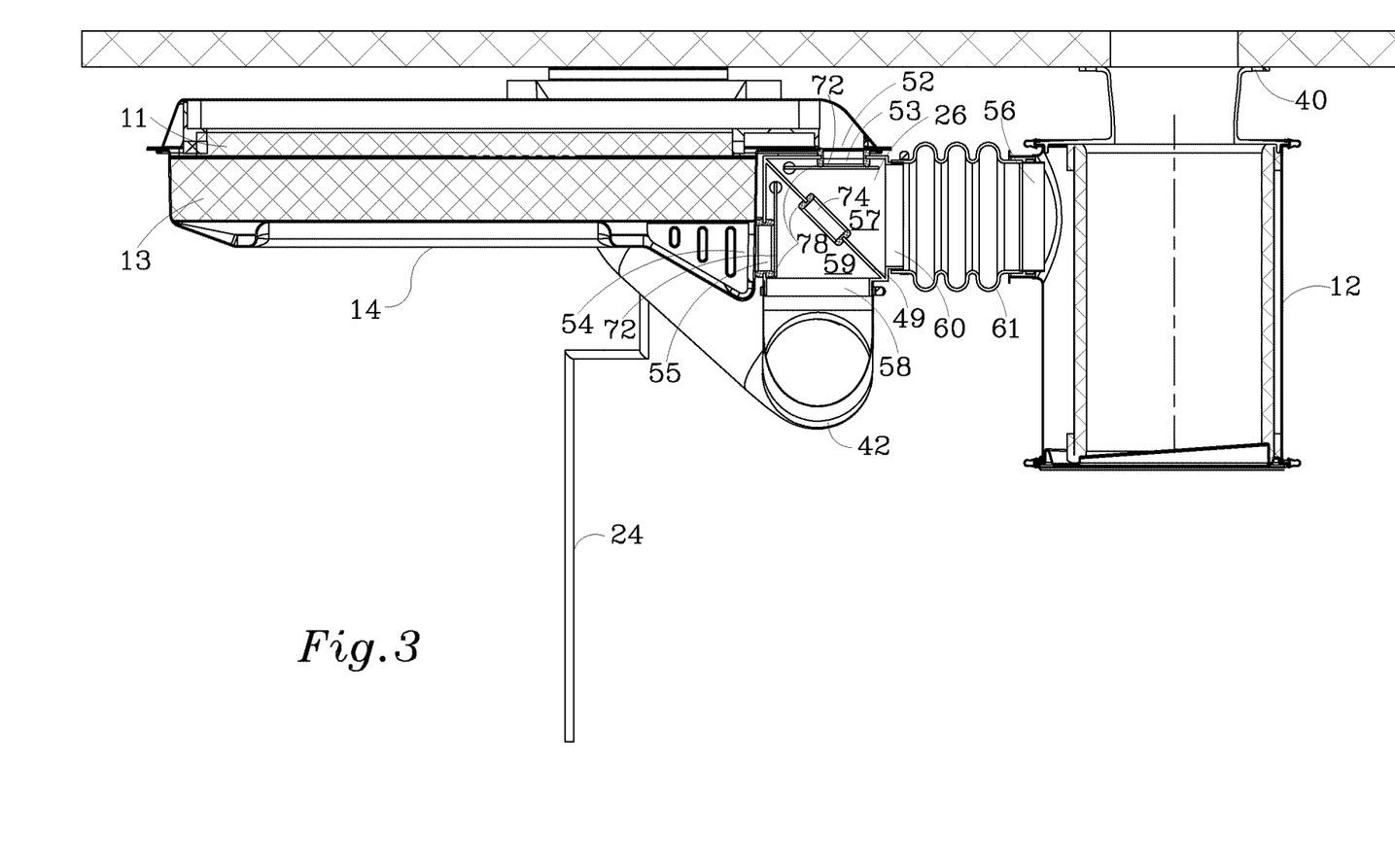
FIG. 3 is a longitudinal section through the NBC filter unit and changeover valve taken along line A-A in FIG. 2.

With reference to FIG. 3 there is shown a section through the NBC filter unit 14 and changeover valve 26, taken along line A-A in FIG. 2 depicting the air flow path and changeover valve direction flaps 72. In order to achieve one aspect of the present invention, the NBC filter unit 14 preferably accepts an elongated cuboid shape where the inlet 52 and outlet 54 are both located at one end of the NBC filter unit 14 at close proximity to each other, and the pre-filter outlet 56 is located in proximity to the NBC filter unit inlet 52 and outlet 54, with the changeover valve 26 located there between, resulting in simple operation of the changeover valve 26 by the state selector handle (28 FIG. 2) and space saving by the changeover valve replacing prior art space consuming interchangeable flexible pipes.

The changeover valve 26 is preferably square in cross section, comprising a first and second prismatic volumes 57, 59 respectively, separated by a diagonal wall 49 having a through passage 74. The changeover valve 26 further comprising a primary inlet 60 being in flow communication with the pre-filter outlet 56 by flexible pipe 61, a secondary outlet 53 being in flow communication with the NBC filter unit inlet 52, a secondary inlet 55 being in flow communication with the NBC filter unit outlet 54 and a primary outlet 58 being in flow communication with the suction port of the electric blower 16 by flexible pipe 42 or curved duct 34 (FIG. 1*b*). The changeover valve further comprises two spring loaded flaps 72 simultaneously switched by a single state selector handle 28 (FIGS. 1*a* and 2) to change position from a bypass state as shown in FIG. 3, where the primary inlet 60 and the primary outlet 58 are internally connected through passage 74, to an NBC filtration state wherein the primary inlet 60 is internally connected through the first prismatic volume 57 with the secondary outlet 53, the primary outlet 58 is internally connected through the second prismatic volume 59 with the secondary inlet 55 and the passage 74 is blocked by flaps 72.

The initial position of the flaps 72 during normal times and even during conventional hazard is the bypass state where the flaps are pressed against elastomer seals 78 located around the inlet 52 and outlet 54 of the NBC filter unit 14, The seals 78 have an appropriate sealing properties for protection of the NBC filter unit against gas, moisture and particle intrusion. During NBC hazard, the changeover valve state is changed such that flaps 72 are pressed against the elastomer seal 78 around passage 74 thus the bypass path is closed and air is forced by the electric blower 16 from the NBC filter unit 14 inlet 52 through the particulate filter 11 and adsorption filter 13 and back towards the NBC filter unit 14 outlet 54.

Figure 4A:
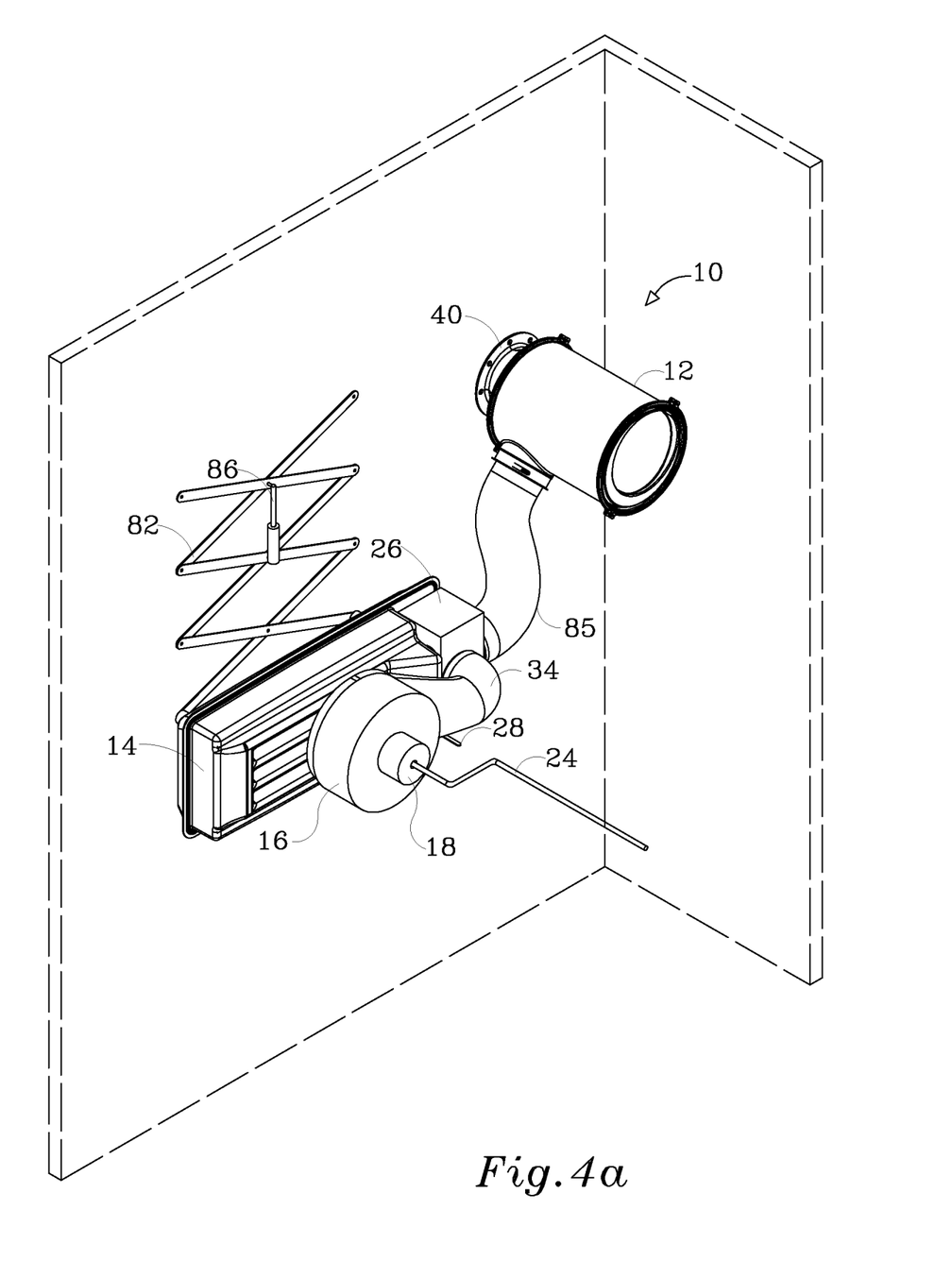
FIGS. 4a and 4b are perspective views of an NBC filtration system made according to an embodiment of the present invention where the entire system is fitted higher than average person height, but the NBC filter unit including the attached thereon electric blower and manual air exchange backup can be lowered using several mechanisms.
Figure 4B:
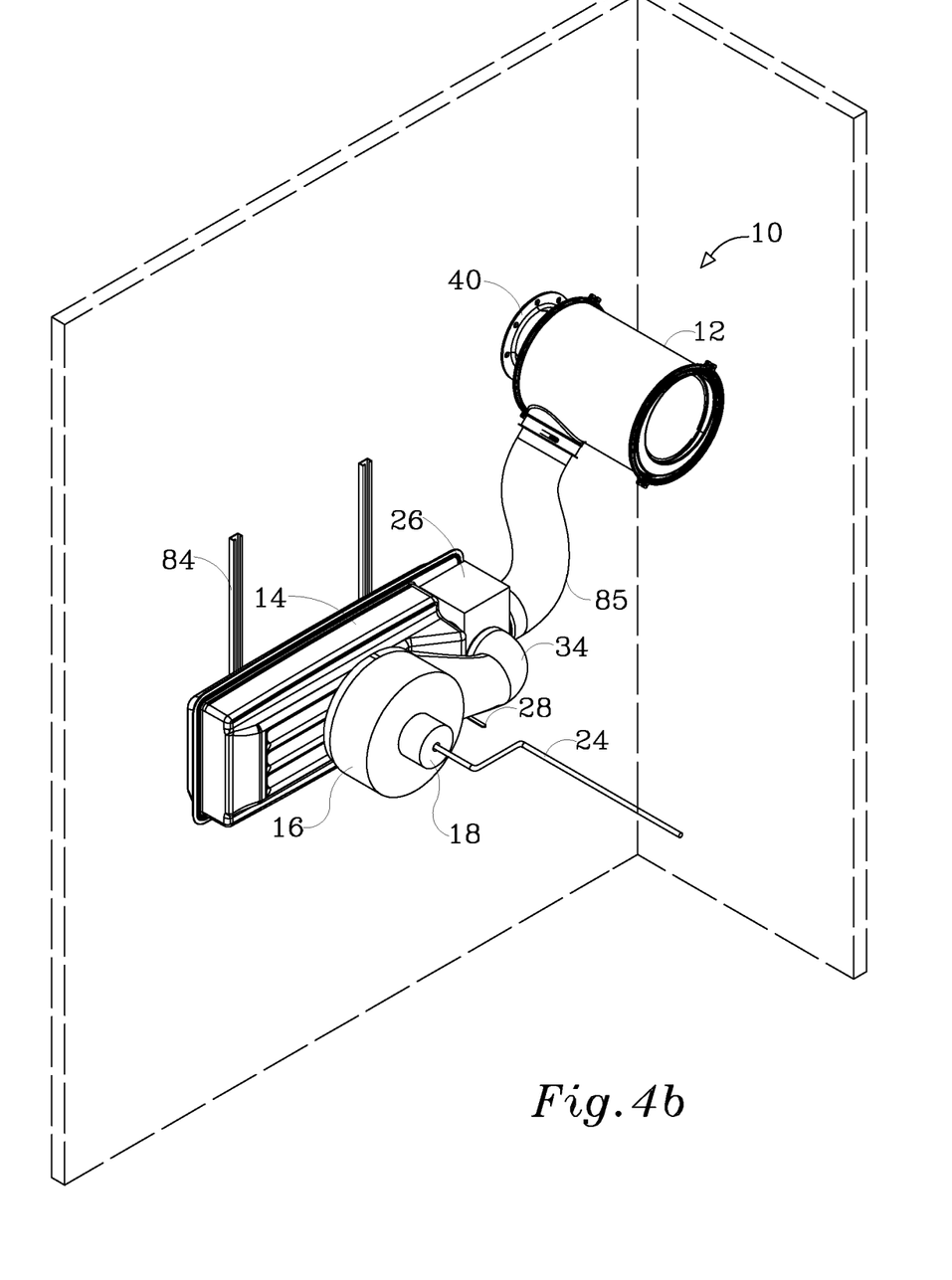

With reference to FIGS. 4*a* and 4*b*, the electric blower 16 with manual air exchange backup 18 and human power interface such as hand crank 24 fitted thereon, are attached to the NBC filter unit 14, having a compact curved duct 34 for sucking air from the primary outlet 58 (FIG. 3) of the changeover valve 26. When the NBC filtration system 10 is assembled higher than an average person height, the NBC filter unit 14 including the attached thereon electric blower 16 with manual air exchange backup 18 and human power interface such as hand crank 24 fitted thereon, may be vertically downwards movable to gain access to the human power interface such as hand crank 24, in case of electric power failure. The moving mechanism may include scissors lift mechanism 82 (FIG. 4*a*), vertical rails 84 and gliders movable thereon (FIG. 4*b*), swivel arm (not shown) or any other mechanism. To complete continuity of the air flow path, a flexible extension pipe 85 is fitted between the pre-filter 12 outlet 56, and the changeover valve 26 primary inlet 60.

As shown in FIG. 4*a*, the scissors lift mechanism 82 may be provided with a gas spring cylinder 86 or ordinary spring to balance the weight of the NBC filter unit 14 and attached components while manually moved to the desired height. Optionally, in relation to the scissors lift mechanism 82 and also to the rails 84 mechanism shown in FIG. 4*b*, the NBC filter unit may be tied to a steel wire rope curved about a fixed pulley with a counter balance weight hanged at the other end of the steel wire rope. A locking mechanism may be provided in order to lock the system at the desired height.

It will be understood that at the same manner, when the entire NBC filtration system 10 is assembled higher than an average person height, only the electric blower 16 with manual air exchange backup 18 and human power interface such as hand crank 24 fitted thereon, may be vertically downwards movable to gain access to the human power interface such as hand crank 24, in case of electric power failure. The moving mechanism may adopt the same options as mentioned above with reference to FIGS. 4*a* and 4*b*.

Figure 5A:
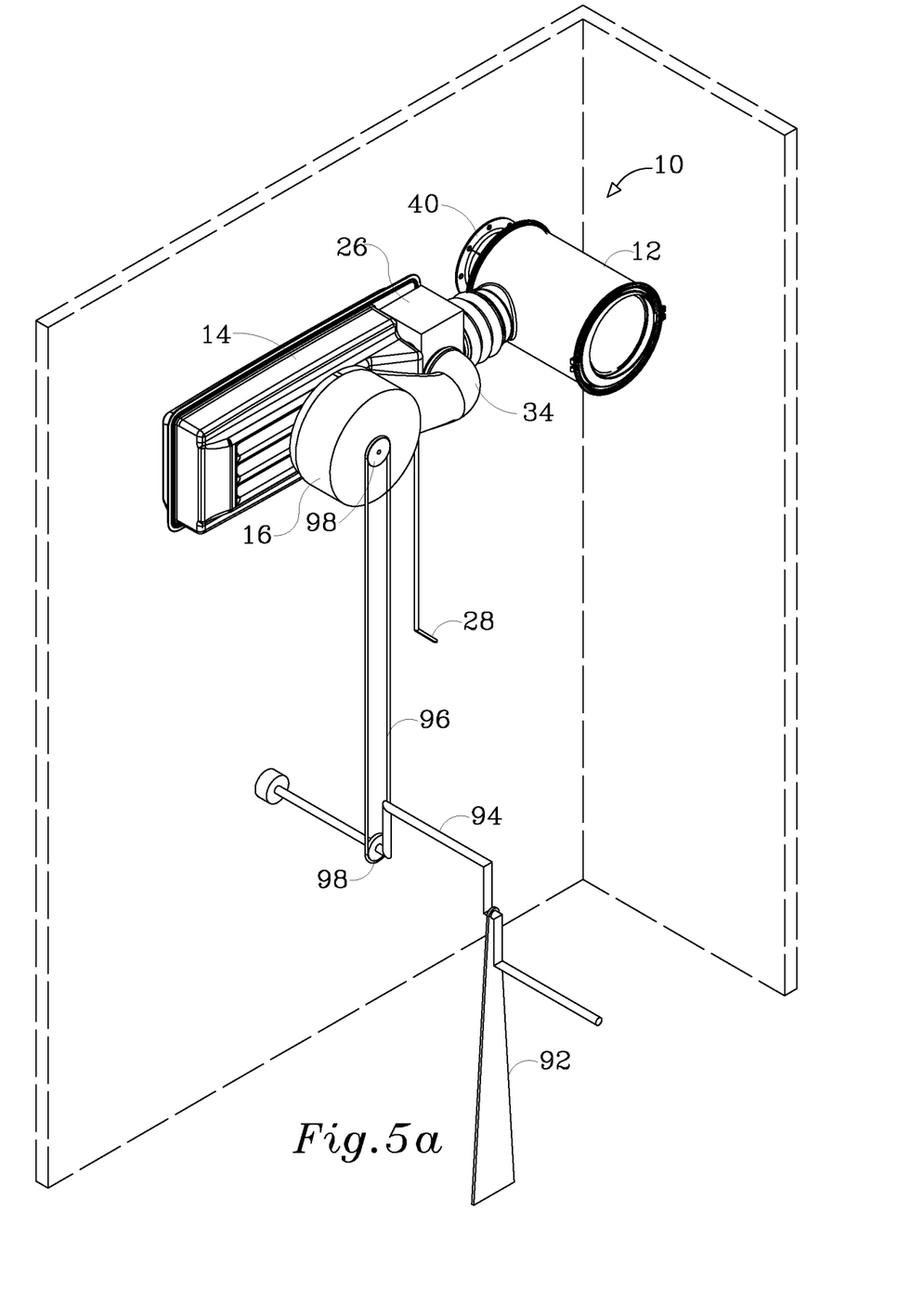
FIGS. 5a to 5c are perspective views of an NBC filtration system made according to an embodiment of the present invention where the manual air exchange backup is remotely powered.
Figure 5B:
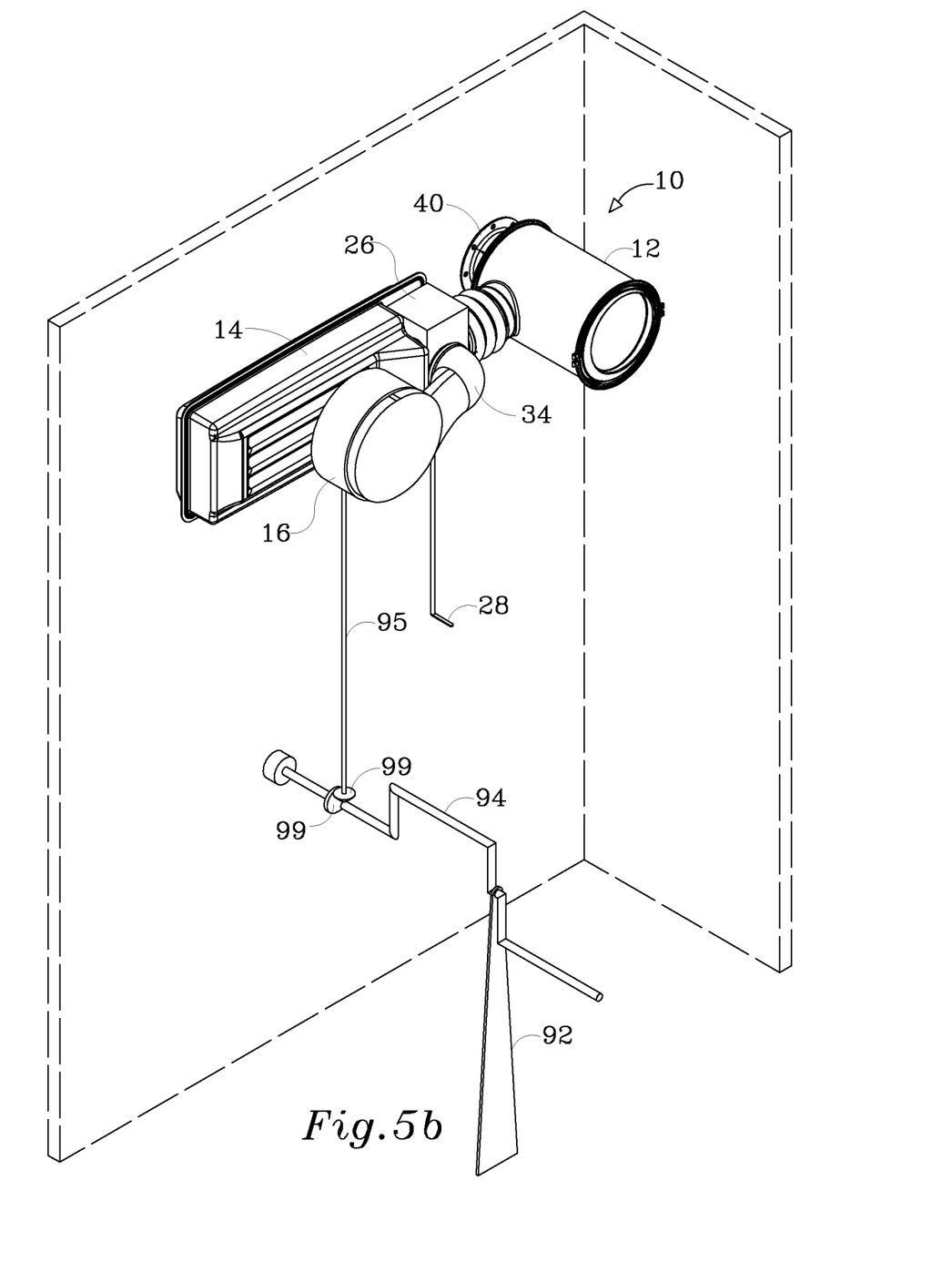
Figure 5C:
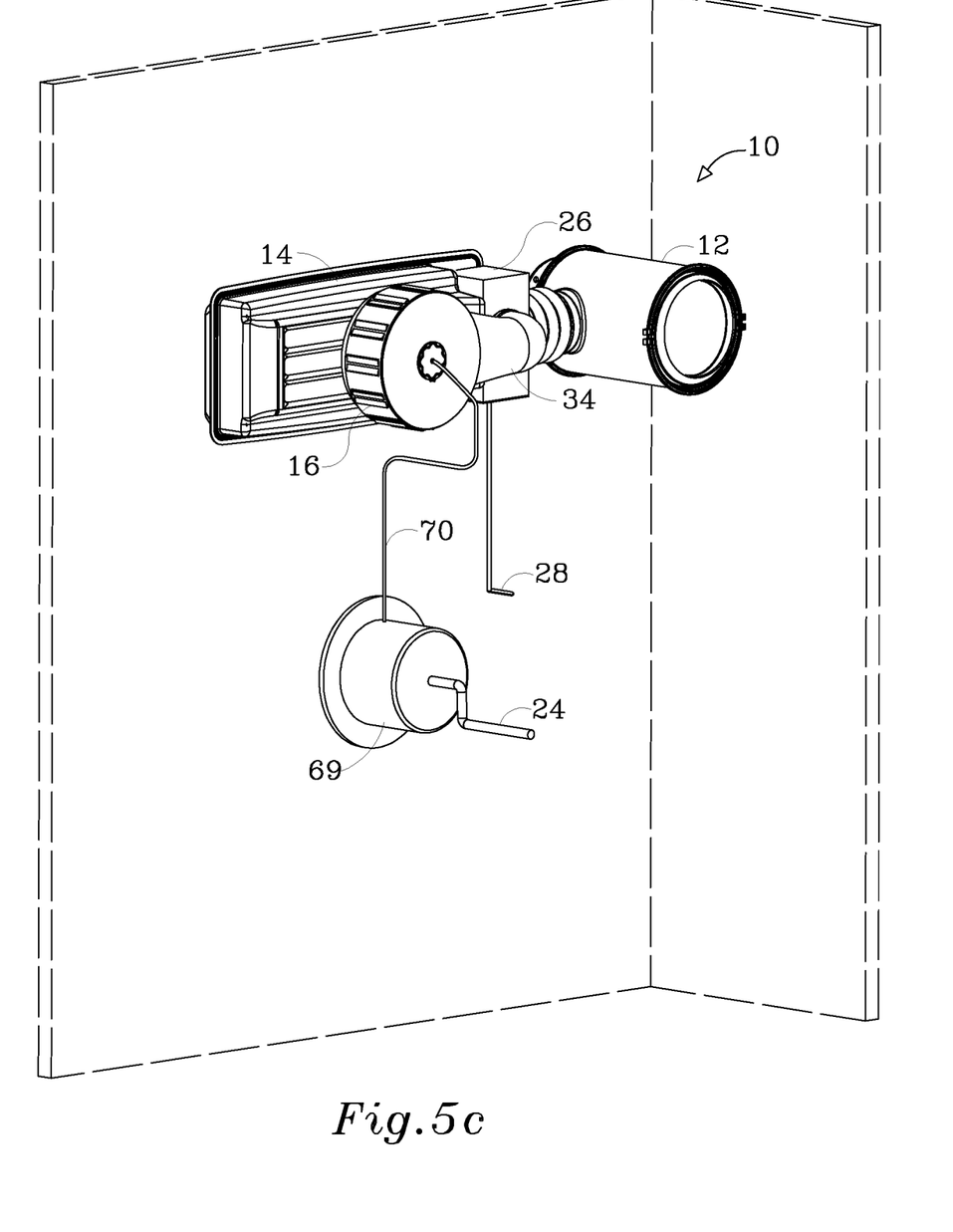

Yet another option to operate the NBC filtration system, where the manual air exchange backup is located higher than an average person height, is shown in FIGS. 5*a* to 5*c* where the human power interface such as hand crank 94 or 24 (FIG. 5*c*) or foot pedals (not shown), is remotely mechanically or electrically linked to the unreachable NBC filtration system. As shown in FIGS. 5*a* and 5*b*, the manual air exchange backup is remotely powered by an optional dual-crank hand crank 94 located as a separate unit at the proper height for use by an average person. The hand crank 94 is supported to the wall at one side and optionally supported with a detachable floor stand 92 at the other side to firmly hold the hand crank 94 during usage. Optionally, the hand crank 94 could be fitted to the wall only using appropriate carrying capacity bearings such that floor stand 92 is not needed. The power is transmitted through mechanical power transmission means such as drive-belt or chain 96 with pulleys or sprockets 98 fitted on the hand crank 94 and on the electric blower 16 shaft as shown in FIG. 5*a*.

Another mechanical link option shown in FIG. 5*b* is a drive-shaft 95 and pair of bevel gears 99 fitted to the hand crank 94 and to the end of the lower end of drive shaft 95, as well as to the upper end of the drive shaft 95 and to the electric blower shaft (not shown). It will be understood that any combination of the listed options or other mechanical means can be used and all fall under the scope of the present invention. Yet another mechanical link option is a reciprocating arm linkage (not Shown).

Typically, the manual air exchange backup 18 includes a speed increaser gear having an input shaft manually rotated by the human power interface such as hand crank 24 or foot pedals (not shown), and an output shaft engaged to rotate the electric blower. Optionally, as shown in FIG. 5c, an electric generator 69 may function as a manual air exchange backup and replace the speed increaser gear. The electric generator 69 is fixed to the shelter wall at the proper height for use by an average person, and is operated by a human power interface such as hand crank 24 or foot pedals (not shown) to generate electric power transmitted by cable 70 to the electric blower 16. The benefit of using an electric generator is the elimination of the speed increaser gear and the ease of remotely powering the generator, using wire cable only, from a location within the comfortable reach of the shelter occupants, while the NBC filtration system is contained in a space out of the comfortable reach of the shelter occupants, for example higher than the average person height.

In the above options described with reference to FIGS. 4a to 5c, the NBC filter unit preferably accepts an elongated cuboid shape located horizontally at the height of the vent pipe, thus when the vent pipe is fitted above an average person height, or height adapter pipe as described above is provided, the entire NBC filtration system is located above the average person height. Accordingly, the space below the entire NBC filtration system 10, is available for daily usage during normal times. It will be understood that for those disclosed embodiments, actually no floor-space is needed for the NBC filtration system during normal times. Floor-space is needed only during electric power failure, for operation of the human power interface such as hand crank 94 or 24 or foot pedals (not shown) of the manual air exchange backup 18 or 69 using one of the methods described above. The detachable floor stand 92 (FIGS. 5a and 5b) may be removed during normal times and stored at a dedicated space for emergency.

As mentioned above, the means for changing the NBC filtration system state is preferably a changeover valve 26, however other means are also possible and falls under the scope of the present invention. For example FIGS. 6a and 6b depicts an NBC filtration system without a changeover valve, located higher than an average person height. Two connectable flexible pipes 62, 64 are provided and connected to each other (FIG. 6a) during normal times or conventional hazard, such that air is sucked by the electric blower 16 from the pre-filter 12 directly into the shelter space. During NBC hazard the shelter occupants may use a fixed or foldable stool 66 to stand on and redirect the flexible pipes such that pipe 62 is connected to the NBC filter unit 14 outlet 58 (FIG. 3) and pipe 64 is connected to NBC filter unit 14 inlet 60 (FIG. 3) as shown in FIG. 6b.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. A floor-space saving NBC filtration system for collective protection shelters comprising: an NBC filter unit; an electric blower; a manual air exchange backup for operation during electric power failure; and a changeover valve configured for changing the NBC filtration system state between a ventilation mode, effective during normal times or conventional hazard, and an NBC protection mode, effective during NBC hazard; wherein said NBC filtration system is fixedly contained in a space located higher than an average person height thus saving usable floor-space, and wherein at least one of said changeover valve and said air exchange backup is remotely operated from a location within the comfortable reach of shelter occupants at the arm height of an average person, by usage of a human power interface and a mechanical or electric linkage for operation of said manual air exchange backup, and by usage of an extended state selector handle for switching the state of said changeover valve.

2. The floor-space saving NBC filtration system as claimed in claim 1, wherein said human power interface is detachably fitted to said manual air exchange backup and wherein said manual air exchange backup is vertically downwards movable to gain access to said human power interface in case of electric power failure.

3. The floor-space saving NBC filtration system as claimed in claim 2, wherein said manual air exchange backup is vertically downwards movable by a moving mechanism selected from the group consisting of: scissors lift mechanism, vertical rails and gliders movable thereon, and a swivel arm.

4. The floor-space saving NBC filtration system as claimed in claim 1, wherein said manual air exchange backup is located higher than an average person height, and is remotely powered by said human power interface, located at the proper height for use by an average person, through a mechanical power transmission selected from the group consisting of a drive-belt, a chain, a drive-shaft and gears, a reciprocating arm linkage or any combination of the listed options.

5. The floor-space saving NBC filtration system as claimed in claim 1, wherein said human power interface is detachable and is removed and stored during normal times such that no floor-space is needed for said NBC filtration system during normal times.

6. The floor-space saving NBC filtration system as claimed in claim 1, wherein said manual air exchange backup comprises a speed increaser gear having an input shaft manually rotated by said human power interface and an output shaft engaged to rotate said electric blower.

7. The floor-space saving NBC filtration system as claimed in claim 1, wherein said manual air exchange backup comprises an electric generator manually rotated by said human power interface to generate electric power for said electric blower.

8. A floor-space saving NBC filtration system for collective protection shelters comprising: an NBC filter unit; an electric blower; a manual air exchange backup for operation during electric power failure; and connectible flexible pipes configured for changing the NBC filtration system state between a ventilation mode, effective during normal times or conventional hazard, and an NBC protection mode, effective during NBC hazard, wherein said NBC filtration system is fixedly contained in a space located higher than an average person height thus saving usable floor-space, and wherein said manual air exchange backup is remotely operated from a location within the comfortable reach of shelter occupants at the arm height of an average person, using a separate hand crank and a mechanical power transmission.

9. The floor-space saving NBC filtration system as claimed in claim 8, wherein said hand crank is supported to a wall of said shelter at one end and supported with a detachable floor stand at the other end to firmly hold the hand crank during usage.

10. The floor-space saving NBC filtration system as claimed in claim 8, wherein said hand crank is fitted to a wall of said shelter at one end only, using a bearings of an appropriate carrying capacity.

11. The floor-space saving NBC filtration system as claimed in claim 8, wherein said power transmission is selected from the group consisting of: belt drive with pulleys; chain drive with sprockets; drive-shaft with bevel gears; and any combination of the listed options.

12. AThe floor space saving NBC filtration system as claimed in claim 1, wherein the NBC filter unit includes a particulate filter and an adsorption filter; further comprising a pre-filter; said pre-filter is in service at both ventilation mode and NBC protection mode, while said NBC filter unit is in service at NBC protection mode only, said changeover valve is switched during NBC protection hazard to redirect air through said NBC filter unit, wherein an inlet and an outlet of said NBC filter unit are located at proximity to each other, and wherein an outlet of said pre-filter is located in proximity to said inlet and outlet of said NBC filter unit, with said changeover valve located there between, resulting in simple operation and space saving by said changeover valve replacing space consuming flexible pipes.

13. The space saving NBC filtration system as claimed in claim 12, wherein said electric blower and said manual air exchange backup are attached to said NBC filter unit, said electric blower is provided with a compact curved duct for sucking air from a primary outlet of said changeover valve.

14. The space saving NBC filtration system as claimed in claim 12, wherein said NBC filter unit is elongated in shape, positioned vertically under said pre-filter and wherein said electric blower and manual air exchange backup are attached to said NBC filter unit, and are located at the proper height for operation of said human power interface by an average person.

15. The space saving NBC filtration system as claimed in claim 13, wherein said changeover valve comprises a primary inlet being in flow communication with said pre-filter outlet, a secondary outlet being in flow communication with said NBC filter unit inlet, a secondary inlet being in flow communication with said NBC filter unit outlet and a primary outlet being in flow communication with a suction port of said electric blower and wherein said changeover valve comprises two spring loaded flaps simultaneously switched by a single state selector handle, in order to change said flaps position from a bypass state wherein said primary inlet and said primary outlet are internally connected, to an NBC filtration state wherein said primary inlet is internally connected with said secondary outlet and said primary outlet is internally connected with said secondary inlet.

16. The space saving NBC filtration system as claimed in claim 13 wherein said NBC filtration system is horizontally positioned higher than an average person height.

\* \* \* \* \*